(12) United States Patent
Eddy

(10) Patent No.: US 12,240,636 B2
(45) Date of Patent: Mar. 4, 2025

(54) METHOD AND DEVICE FOR STORING A HYPOCHLOROUS ACID SOLUTION

(71) Applicant: Parasol Medical, LLC, Buffalo Grove, IL (US)

(72) Inventor: Patrick E. Eddy, Allendale, MI (US)

(73) Assignee: Parasol Medical, LLC, Buffalo Grove, IL (US)

( * ) Notice: Subject to any disclaimer, the term of this patent is extended or adjusted under 35 U.S.C. 154(b) by 381 days.

(21) Appl. No.: 17/397,422

(22) Filed: Aug. 9, 2021

(65) Prior Publication Data

US 2022/0041315 A1  Feb. 10, 2022

Related U.S. Application Data

(60) Provisional application No. 62/706,276, filed on Aug. 7, 2020.

(51) Int. Cl.
  *B65B 31/00*  (2006.01)
  *C01B 11/04*  (2006.01)
  *B65D 83/62*  (2006.01)

(52) U.S. Cl.
  CPC ............ *B65B 31/003* (2013.01); *C01B 11/04* (2013.01); *B65D 83/62* (2013.01)

(58) Field of Classification Search
  CPC .............................. B65B 31/003; C01B 11/04
  USPC .................................................. 141/3, 4, 20
  See application file for complete search history.

(56) References Cited

U.S. PATENT DOCUMENTS

| | | | |
|---|---|---|---|
| 8,844,584 B1 * | 9/2014 | Haley | B65B 3/17 141/20 |
| 10,472,162 B2 | 11/2019 | Gonzalez | |
| 2007/0237901 A1 * | 10/2007 | Moses | A01N 55/00 427/384 |
| 2015/0119245 A1 * | 4/2015 | Robertson, Jr. | A01N 59/00 424/661 |
| 2019/0023975 A1 * | 1/2019 | Shim | C09K 8/605 |
| 2021/0032576 A1 * | 2/2021 | Hawkins | A01N 25/26 |

* cited by examiner

*Primary Examiner* — Jason K Niesz
(74) *Attorney, Agent, or Firm* — Price Heneveld LLP

(57) ABSTRACT

A method is provided for filling a bag-on-valve can with a hypochlorous acid solution, including: providing a hypochlorous acid manufacturing apparatus having an anolyte storage tank in which the hypochlorous acid solution is stored; providing a bag-on-valve canning apparatus having a fluid inlet; connecting a pipe between the anolyte storage tank of the hypochlorous acid manufacturing apparatus and the fluid inlet on the bag-on-valve canning apparatus in order to provide the hypochlorous acid solution directly from the hypochlorous acid manufacturing apparatus to the bag-on-valve canning apparatus; providing a bag-on-valve can having a can in which a bag and a valve are disposed, wherein the valve seals the bag during non-use, the bag-on-valve can further including an actuator for actuating the valve; and filling the bag with the hypochlorous acid solution provided through the pipe. An apparatus is also disclosed for producing and canning a hypochlorous acid solution.

17 Claims, 4 Drawing Sheets

METHOD AND DEVICE FOR STORING A HYPOCHLOROUS ACID SOLUTION

CROSS-REFERENCE TO RELATED APPLICATION

This application claims priority to and the benefit under 35 U.S.C. § 119(e) of U.S. Provisional Patent Application No. 62/706,276, filed on Aug. 7, 2020, entitled "METHOD AND DEVICE FOR STORING A HYPOCHLOROUS ACID SOLUTION," by Patrick E. Eddy, the entire disclosure of which is incorporated herein by reference.

BACKGROUND OF THE DISCLOSURE

The present invention relates to a method and a device for storing and dispensing a hypochlorous acid solution.

The electrolysis of an aqueous solution of sodium chloride (sometimes referred to as a brine solution) generates hypochlorous acid (HOCl). More specifically, an electrolytic cell typically with a membrane permeable to sodium and chloride ions separates an anode from a cathode. At the anode, an acidic solution of hypochlorous acid, hydrochloric acid (HCl), and the hypochlorite ion (ClO$^-$), is produced, as is oxygen ($O_2$) and chlorine ($Cl_2$) gases. The chlorine components are in equilibrium, and the dominant chemical is a function of pH, with hypochlorous acid being dominant at pH values between 2 and 7. At the cathode, a basic solution of sodium hydroxide (NaOH) is produced, as well as hydrogen ($H_2$) gas. The acidic solution generated at the anode is sometimes referred to as the "anolyte" or "acidic electrolyzed water." The basic solution generated at the cathode is sometimes referred to as the "catholyte" or "basic electrolyzed water." The combination of the two is sometimes referred to as "neutral electrolyzed water."

Hypochlorous acid has been used as a sanitizing agent, disinfecting agent, and an antimicrobial agent in various applications. Example applications for hypochlorous acid include disinfecting food processing surfaces and sanitizing medical equipment in hospitals. Hypochlorous acid very rapidly kills microorganisms by irreversibly reacting with membrane enzymes and structural proteins. The "catholyte," containing sodium hydroxide, has been utilized as a cleaning agent.

However, the reactivity of hypochlorous acid poses a problem in that hypochlorous acid cannot be a persistent or prophylactic antimicrobial agent. Similarly, the "anolyte" has a limited shelf life with concentration of hypochlorous acid decreasing quickly as a function of time.

BRIEF SUMMARY OF THE DISCLOSURE

The present disclosure solves that problem by significantly reducing the exposure of the hypochlorous acid solution to the atmosphere and light during the transfer of the hypochlorous acid solution from a hypochlorous acid manufacturing apparatus to a bag-on-valve canning apparatus.

According to one aspect of the present disclosure, a method is provided for filling a bag-on-valve can with a hypochlorous acid solution, comprising: providing a hypochlorous acid manufacturing apparatus having an anolyte storage tank in which the hypochlorous acid solution is stored; providing a bag-on-valve canning apparatus having a fluid inlet; connecting a pipe between the anolyte storage tank of the hypochlorous acid manufacturing apparatus and the fluid inlet on the bag-on-valve canning apparatus in order to provide the hypochlorous acid solution directly from the hypochlorous acid manufacturing apparatus to the bag-on-valve canning apparatus; providing a bag-on-valve can having a can in which a bag and a valve are disposed, wherein the valve seals the bag during non-use, the bag-on-valve can further including an actuator for actuating the valve; and using the bag-on-valve canning apparatus to fill the bag with the hypochlorous acid solution provided through the pipe.

According to another aspect of the present disclosure, an apparatus is provided for producing and canning a hypochlorous acid solution. The apparatus comprising: a hypochlorous acid manufacturing apparatus having an anolyte storage tank in which the hypochlorous acid solution is stored; a bag-on-valve canning apparatus having a fluid inlet; and a pipe connected between the anolyte storage tank of the hypochlorous acid manufacturing apparatus and the fluid inlet on the bag-on-valve canning apparatus in order to provide the hypochlorous acid solution directly from the hypochlorous acid manufacturing apparatus to the bag-on-valve canning apparatus.

According to another aspect of the present disclosure, a method for filling a bag-on-valve can with a hypochlorous acid solution, comprising: providing a hypochlorous acid manufacturing apparatus having an anolyte storage tank in which the hypochlorous acid solution is stored, wherein the hypochlorous acid solution comprises at least about 600 ppm; providing a bag-on-valve canning apparatus having a fluid inlet; connecting a pipe between the anolyte storage tank of the hypochlorous acid manufacturing apparatus and the fluid inlet on the bag-on-valve canning apparatus in order to provide the hypochlorous acid solution directly from the hypochlorous acid manufacturing apparatus to the bag-on-valve canning apparatus; providing a bag-on-valve can having a can in which a bag and a valve are disposed, wherein the valve seals the bag during non-use, the bag-on-valve can further including an actuator for actuating the valve; using the bag-on-valve canning apparatus to fill the bag with the hypochlorous acid solution provided through the pipe; and filling a propellant within the bag-on-valve can around the outside of the bag to a pressure of about 30 psi to about 80 psi.

These and other features, advantages, and objects of the present disclosure will be further understood and appreciated by those skilled in the art by reference to the following specification, claims, and appended drawings.

DETAILED DESCRIPTION

Figure 1:
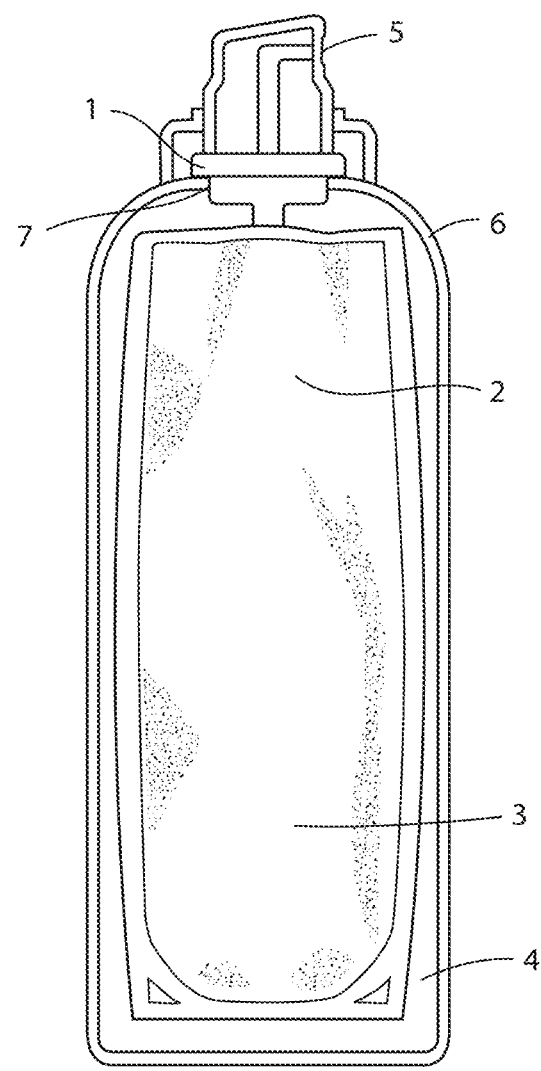
FIG. 1 is a cross-sectional view of a bag-on-valve can.

The present illustrated embodiments reside primarily in combinations of method steps and apparatus components related to a bag-on-valve can. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the invention may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. An element preceded by "comprises a . . . " does not, without more constraints, preclude the existence of additional identical elements in the process, method, article, or apparatus that comprises the element.

FIG. 1 shows an example of a bag-on-valve can 10 in which the hypochlorous acid solution 3 may be stored and dispensed. The bag-on-valve can 10 may include a can 6 having an opening 7, a valve 1 sealed in the opening 7 of the can 6, a bag 2 attached to the valve 1 and provided in the can 6, wherein the bag 2 is filled with the hypochlorous acid solution 3. The can 6 may further contain a propellant 4 outside the bag 2.

The bag 2 may be made of polyethylene terephthalate (PET), polypropylene (PP), or polyethylene (PE). The can 6 may be made of aluminum or tin plate. The propellant 4 may be compressed air or nitrogen. The propellant 4 may have a pressure of 30-80 psi.

The hypochlorous acid is the product of electrolysis of an aqueous solution of sodium chloride. The hypochlorous acid may exist in the solution at a concentration of 0.1 to 1000 ppm, such as a concentration of 0.1 to 200 ppm, a concentration of 200 to 1000 ppm, or a concentration of about 600 ppm.

Figure 2:
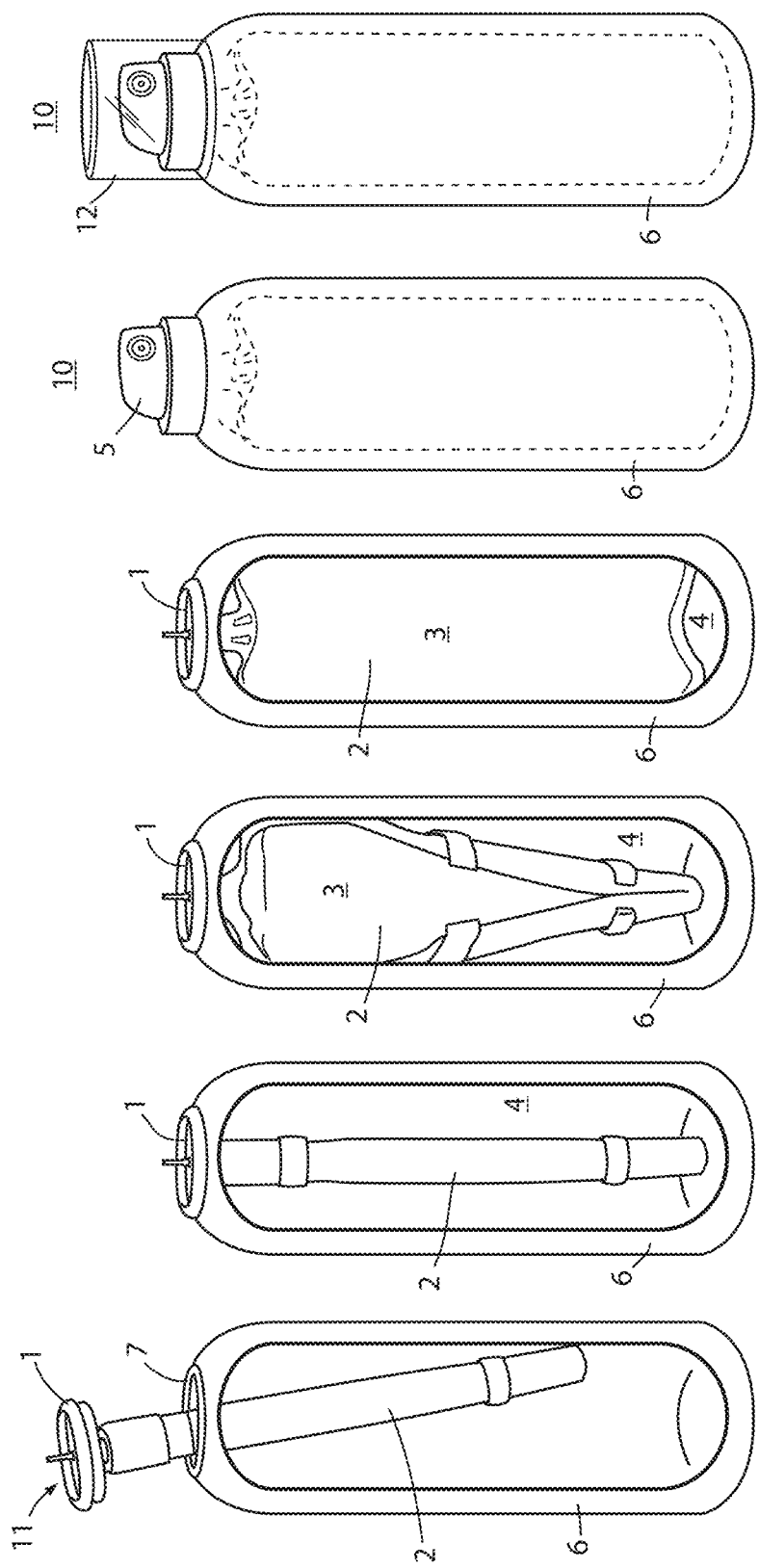
FIGS. 2A-2F are cross-sectional and perspective views of the assembly and filling of the bag-on-valve can shown in FIG. 1.

Referring now to FIGS. 2A-2F and FIG. 3, a method 20 of storing the hypochlorous acid solution in a bag-on-valve can 10 is described. The first step 22 in the method 20 is to insert a bag-on-valve subassembly 11 into the opening 7 of the can 6. The bag-on-valve subassembly 11 includes the valve 1 and the bag 2. This is shown in FIG. 2A.

Figure 3:
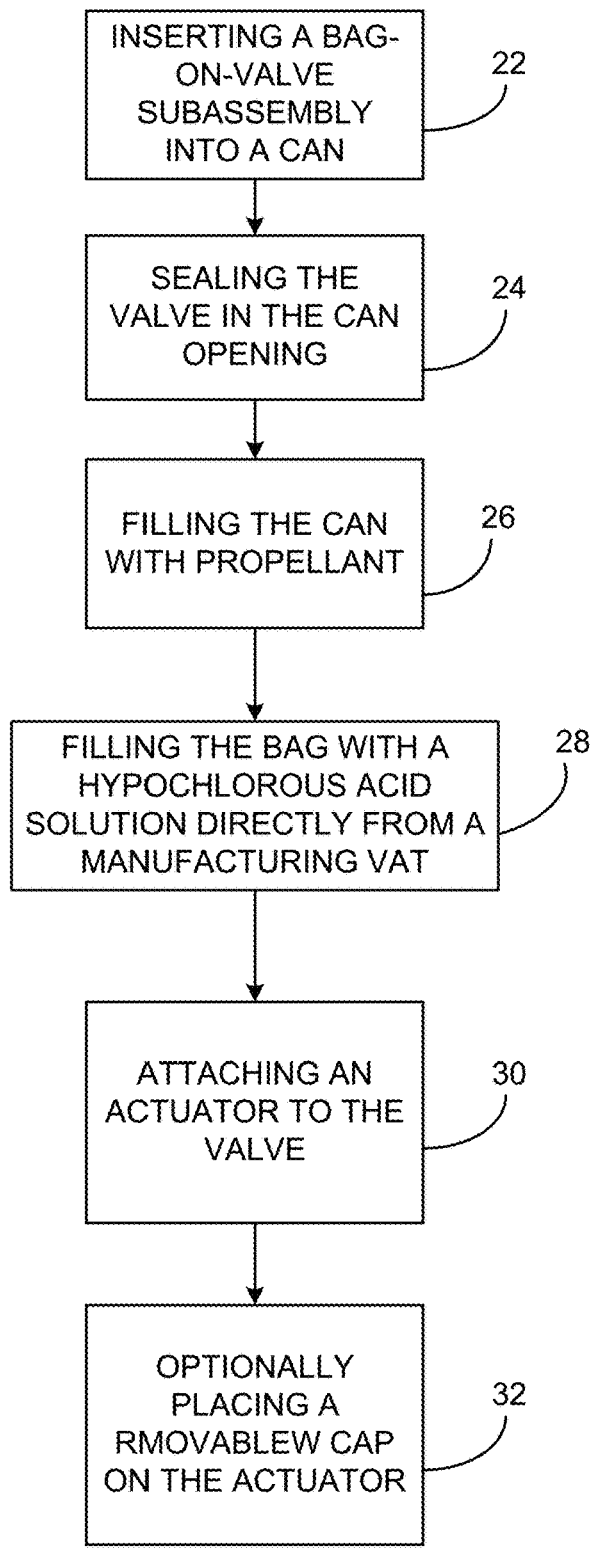
FIG. 3 is a flow chart illustrating the method of assembling and filling the bag-on-valve can shown in FIG. 1.

As shown in FIG. 2B and FIG. 3, the next step 24 is to seal the valve 1 in the can opening 7. Then in step 26, the can 6 may be filled with propellant 4. Alternatively, the first step 22 of inserting the subassembly 11 into the can 6, may be performed in a propellant-rich pressurized environment so that when the sealing step 24 occurs, the propellant 4 is already in the can 6.

Figure 4:
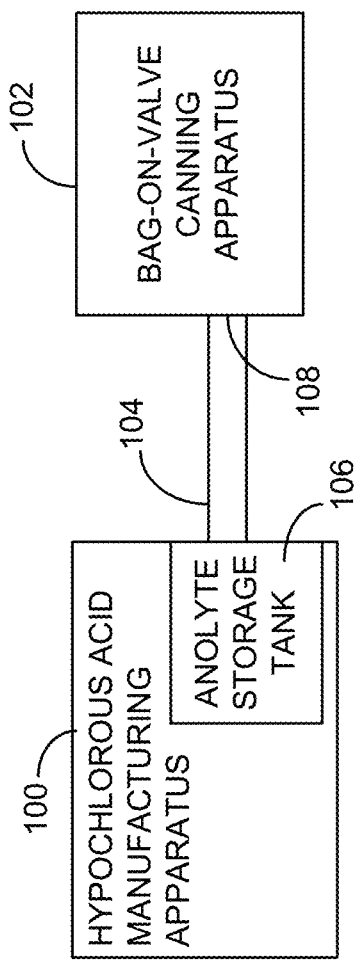
FIG. 4 is a block diagram illustrating an apparatus for producing and canning the hypochlorous acid solution.

Next, in step 28, the bag 2 is filled with the hypochlorous acid solution 3 through the valve 1. This step is illustrated in FIGS. 2C and 2D. The hypochlorous acid solution 3 may be directly piped from an anolyte storage tank 106 of a hypochlorous acid manufacturing apparatus 100 to a fluid inlet 108 of a bag-on-valve canning apparatus 102 that fills the bag-on-valve cans 10 with the hypochlorous acid solution 3 (see FIG. 4). Examples of a hypochlorous acid manufacturing apparatus 100 is disclosed in U.S. Pat. Nos. 9,347,140 and 9,777,383. These hypochlorous acid manufacturing apparatus 100 are capable of producing hypochlorous acid from 0.1 to 1000 ppm. The canning apparatus 102 may be any conventional canning apparatus for filling bag-on-valve cans 10. The present disclosure includes the novel feature of including piping 104 that allows the hypochlorous acid solution 3 to flow directly from the hypochlorous acid manufacturing apparatus 100 to the canning apparatus 102 rather than being stored in intermediate containers after manufacture for subsequently dumping into the canning apparatus. By supplying the hypochlorous acid solution directly to the canning apparatus 102, the hypochlorous acid solution is not exposed to atmosphere or light that can degrade the hypochlorous acid solution and reduce its shelf life. Thus, by eliminating all exposure to atmosphere and oxygen during the transfer process, the stability of the hypochlorous acid solution 3 will increase.

Then, in step 30, the actuator 5 is attached to the can 6 and valve 1 as shown in FIG. 2E. Last, in step 32, an optional removable cap 12 is placed over the actuator 5 as shown in FIG. 2F.

The hypochlorous acid solution may additionally or alternatively include a chlorine stabilizer. The chlorine stabilizer may be cyanuric acid or any other known pool stabilizer. The chlorine stabilizer may be between 0.1 to 50 percent by weight of the solution.

The hypochlorous acid solution 3 may optionally comprise a silane quaternary ammonium ion or salt thereof. The silane quaternary ammonium ion or salt thereof may be one or more of:

3-(trimethoxysilyl)propyldimethyloctadecyl ammonium ion, 3-(trimethoxysilyl)propyldimethyloctadecyl ammonium chloride, 3-(trihydroxysilyl)propyldimethyloctadecyl ammonium ion, and 3-(trihydroxysilyl)propyldimethyloctadecyl ammonium chloride.

The silane quaternary ammonium ion or salt thereof may be 0.1 to 10 percent by weight of the solution, such as 0.75 to 5 percent by weight of the solution, such as 1.9 to 2.1 percent by weight of the solution.

The hypochlorous acid solution may further include isopropyl alcohol.

In one example, the hypochlorous acid solution may comprise 0.1 to 1000 ppm hypochlorous acid, 0.1 to 10 percent by weight silane quaternary ammonium ion or salt thereof, and water. This solution can further include isopropyl alcohol.

The hypochlorous acid is a component of the anolyte of the electrolysis of an aqueous solution of sodium chloride. In such embodiments, the anolyte containing the hypochlorous acid may be combined with a solution containing the silane quaternary ammonium ion or salt thereof. In a variation, the catholyte product of the electrolysis of the aqueous solution of sodium chloride is also added to the hypochlorous acid solution, thus supplying the aqueous solution with sodium hydroxide.

The addition of the silane quaternary ammonium ion or salt thereof provides long lasting antimicrobial activity that survives after the expiration of hypochlorous acid due to reaction or otherwise. The silane group of the silane quaternary ammonium ion bonds to the surface to which it is applied. When a microbial cell contacts the silane quaternary ammonium ion, it is thought that several mechanisms cause the death of the microbial cell—(1) the quaternary group causes an ionic imbalance in the cell; or (2) the long alkyl chain penetrates into and ruptures the cell. Unlike hypochlorous acid, the silane quaternary ammonium ion destroys the microbe cell without consuming the silane quaternary ammonium ion. The silane quaternary ammonium ion is free to destroy more microbial cells. Therefore, even after the hypochlorous acid has reacted, the silane quaternary ammonium ion remains bonded to the surface to which it was applied to continue to provide antimicrobial properties.

In another aspect of this disclosure, the hypochlorous acid solution may further comprise sodium hydroxide, silane quaternary ammonium ion or salt thereof, and water. The silane quaternary ammonium ion or salt thereof is 0.1 to 10 percent by weight of the solution. The sodium hydroxide is a component of a catholyte product of the electrolysis of the aqueous solution of sodium chloride, and the catholyte product is combined with the silane quaternary ammonium ion or salt thereof.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A method for filling a bag-on-valve can with a hypochlorous acid solution, comprising:
   providing a hypochlorous acid manufacturing apparatus for producing hypochlorous acid by electrolysis of an aqueous solution of sodium chloride, the hypochlorous acid manufacturing apparatus having an anolyte storage tank in which the hypochlorous acid solution is stored;
   providing a bag-on-valve canning apparatus having a fluid inlet;
   connecting a pipe between the anolyte storage tank of the hypochlorous acid manufacturing apparatus and the fluid inlet on the bag-on-valve canning apparatus in order to provide the hypochlorous acid solution directly from the hypochlorous acid manufacturing apparatus to the bag-on-valve canning apparatus;
   providing a bag-on-valve can having a can in which a bag and a valve are disposed, wherein the valve seals the bag during non-use, the bag-on-valve can further including an actuator for actuating the valve;
   using the bag-on-valve canning apparatus to fill the bag with the hypochlorous acid solution provided through the pipe,
   wherein the hypochlorous acid solution comprises:
      hypochlorous acid; and
      a chlorine stabilizer.

2. The method of claim 1, wherein the hypochlorous acid solution comprises at least about 600 ppm.

3. The method of claim 1 and further including filling a propellant within the bag-on-valve can around the outside of the bag to a pressure of about 30 psi to about 80 psi.

4. The method of claim 1, wherein the hypochlorous acid solution comprises:
   hypochlorous acid;
   silane quaternary ammonium ion or salt thereof; and
   water.

5. The method of claim 4, wherein the silane quaternary ammonium ion or salt thereof is one or more of:
   3-(trimethoxysilyl) propyldimethyloctadecyl ammonium ion,
   3-(trimethoxysilyl) propyldimethyloctadecyl ammonium chloride,
   3-(trihydroxysilyl) propyldimethyloctadecyl ammonium ion, and
   3-(trihydroxysilyl) propyldimethyloctadecyl ammonium chloride.

6. The method of claim 4, wherein the silane quaternary ammonium ion or salt thereof is 0.1 to 10 percent by weight of the solution.

7. The method of claim 4, wherein the silane quaternary ammonium ion or salt thereof is 0.75 to 5 percent by weight of the solution.

8. The method of claim 4, wherein the silane quaternary ammonium ion or salt thereof is 1.9 to 2.1 percent by weight of the solution.

9. An apparatus for producing and canning a hypochlorous acid solution, the apparatus comprising:
   a hypochlorous acid manufacturing apparatus for producing hypochlorous acid by electrolysis of an aqueous solution of sodium chloride, the hypochlorous acid manufacturing apparatus having an anolyte storage tank in which the hypochlorous acid solution is stored;
   a bag-on-valve canning apparatus having a fluid inlet;
   a pipe connected between the anolyte storage tank of the hypochlorous acid manufacturing apparatus and the fluid inlet on the bag-on-valve canning apparatus in order to provide the hypochlorous acid solution directly from the hypochlorous acid manufacturing apparatus to the bag-on-valve canning apparatus,
   wherein the hypochlorous acid solution comprises:
      hypochlorous acid; and
      a chlorine stabilizer.

10. The apparatus of claim 9, wherein the hypochlorous acid solution comprises at least about 600 ppm.

11. The apparatus of claim 9, wherein the bag-on-valve canning apparatus receives and fills bag-on-valve cans each including a can in which a bag and a valve are disposed, wherein the valve seals the bag during non-use, each of the bag-on-valve cans further including an actuator for actuating the valve.

12. The apparatus of claim 11, wherein the bag-on-valve canning apparatus is configured to fill a propellant within the bag-on-valve can around the outside of the bag to a pressure of about 30 psi to about 80 psi.

13. The apparatus of claim 9, wherein the hypochlorous acid solution comprises:
   hypochlorous acid;
   silane quaternary ammonium ion or salt thereof; and
   water.

14. The apparatus of claim 13, wherein the silane quaternary ammonium ion or salt thereof is one or more of:
   3-(trimethoxysilyl) propyldimethyloctadecyl ammonium ion,
   3-(trimethoxysilyl) propyldimethyloctadecyl ammonium chloride,
   3-(trihydroxysilyl) propyldimethyloctadecyl ammonium ion, and
   3-(trihydroxysilyl) propyldimethyloctadecyl ammonium chloride.

15. The apparatus of claim 13, wherein the silane quaternary ammonium ion or salt thereof is 0.1 to 10 percent by weight of the solution.

16. The apparatus of claim 13, wherein the silane quaternary ammonium ion or salt thereof is 0.75 to 5 percent by weight of the solution.

17. The apparatus of claim 13, wherein the silane quaternary ammonium ion or salt thereof is 1.9 to 2.1 percent by weight of the solution.

\* \* \* \* \*